US010683031B2

(12) United States Patent
Kondo et al.

(10) Patent No.: US 10,683,031 B2
(45) Date of Patent: Jun. 16, 2020

(54) STEERING SYSTEM

(71) Applicant: JTEKT CORPORATION, Osaka-shi, Osaka (JP)

(72) Inventors: Yoshio Kondo, Okazaki (JP); Masashi Yamaguchi, Toyota (JP)

(73) Assignee: JTEKT CORPORATION, Osaka (JP)

(*) Notice: Subject to any disclaimer, the term of this patent is extended or adjusted under 35 U.S.C. 154(b) by 100 days.

(21) Appl. No.: 15/791,719

(22) Filed: Oct. 24, 2017

(65) Prior Publication Data

US 2018/0118252 A1 May 3, 2018

(30) Foreign Application Priority Data

Oct. 31, 2016 (JP) ................... 2016-213866

(51) Int. Cl.
*B62D 5/04* (2006.01)
*F16C 33/78* (2006.01)
(Continued)

(52) U.S. Cl.
CPC ............. *B62D 5/0448* (2013.01); *B62D 3/12* (2013.01); *B62D 5/0424* (2013.01);
(Continued)

(58) Field of Classification Search
CPC .. F16H 25/2204; F16H 25/20; F16H 25/2214; F16H 25/22; F16C 33/7869;
(Continued)

(56) References Cited

U.S. PATENT DOCUMENTS 3,396,977 A * 8/1968 Zin Iguchi .......... F16C 33/7853
277/353
6,868,936 B2 * 3/2005 Shimizu ............... B62D 5/0424
180/444
(Continued)

FOREIGN PATENT DOCUMENTS

EP   3 254 930 A1   12/2017
NL   8702661 A      6/1989
(Continued)

OTHER PUBLICATIONS

Apr. 3, 2018 Extended European Search Report issued in Patent Application No. 17198898.3.

*Primary Examiner* — Jacob D Knutson
*Assistant Examiner* — Michael R Stabley
(74) *Attorney, Agent, or Firm* — Oliff PLC

(57) ABSTRACT

A rack-parallel steering system that prevents entry of abrasion powder into a rolling bearing is provided. A steering system includes a steered shaft, a rolling element screw portion, a rolling element nut, and a ball screw device. The steering system includes: a motor including an output shaft offset from the steered shaft; a drive force transfer mechanism including a toothed drive pulley, a toothed driven pulley, and a toothed belt; and a rolling bearing supporting a ball screw nut to be rotatable relative to a housing. A first seal member that contacts an outer ring and an inner ring is provided on a side surface of the rolling bearing on the driven pulley side. A second seal member that does not contact the inner ring is provided on a side surface of the ball bearing on the side opposite to the side surface on the driven pulley side.

6 Claims, 3 Drawing Sheets

(51) Int. Cl.
*B62D 3/12* (2006.01)
*F16H 25/22* (2006.01)
*F16H 25/20* (2006.01)

(52) U.S. Cl.
CPC ..... *F16C 33/7869* (2013.01); *F16H 25/2204* (2013.01); *F16H 2025/2081* (2013.01); *F16H 2025/2096* (2013.01)

(58) Field of Classification Search
CPC .. F16C 33/7853; F16C 33/7859; F16C 33/80; F16C 35/077; F16C 35/073; F16C 19/06; F16C 27/066; F16J 15/3264; F16J 15/3256; F16J 15/3456; B62D 3/12; B62D 3/08; B62D 5/0424; B62D 5/0448; B62D 5/0403; B62D 5/04
See application file for complete search history.

(56) References Cited

U.S. PATENT DOCUMENTS

| | | | | |
|---|---|---|---|---|
| 10,196,084 | B2* | 2/2019 | Kim | F16H 35/18 |
| 2004/0221668 | A1* | 11/2004 | Saruwatari | B62D 5/0412 |
| | | | | 74/388 PS |
| 2008/0196995 | A1* | 8/2008 | Mikami | C10M 169/00 |
| | | | | 192/41 R |
| 2009/0294203 | A1* | 12/2009 | Okada | B62D 5/0448 |
| | | | | 180/444 |
| 2011/0069917 | A1* | 3/2011 | Yamada | B65G 39/09 |
| | | | | 384/470 |
| 2011/0075958 | A1* | 3/2011 | Yamaguchi | F16C 33/7853 |
| | | | | 384/484 |
| 2012/0098205 | A1* | 4/2012 | Fritz | F16C 33/782 |
| | | | | 277/411 |
| 2012/0251301 | A1* | 10/2012 | Nishimura | F04C 18/0215 |
| | | | | 415/170.1 |
| 2013/0048411 | A1* | 2/2013 | Lee | B62D 5/0427 |
| | | | | 180/444 |
| 2014/0260727 | A1* | 9/2014 | Webber | B62D 5/0424 |
| | | | | 74/89.23 |
| 2014/0260728 | A1* | 9/2014 | Holm | B62D 5/0448 |
| | | | | 74/89.23 |
| 2014/0345966 | A1* | 11/2014 | Asakura | B62D 5/0445 |
| | | | | 180/444 |
| 2015/0274200 | A1* | 10/2015 | Nakamura | B62D 5/0448 |
| | | | | 180/444 |
| 2015/0321690 | A1* | 11/2015 | Yamaguchi | F16H 25/2223 |
| | | | | 180/444 |
| 2017/0050669 | A1* | 2/2017 | Asakura | B62D 5/0481 |
| 2017/0349205 | A1* | 12/2017 | Kaneko | F16H 7/02 |

FOREIGN PATENT DOCUMENTS

| | | | | |
|---|---|---|---|---|
| WO | 2016/125368 | A1 | 8/2016 | |
| WO | WO-2016125368 | A1 * | 8/2016 | ............... F16H 7/02 |

* cited by examiner

STEERING SYSTEM

INCORPORATION BY REFERENCE

The disclosure of Japanese Patent Application No. 2016-213866 filed on Oct. 31, 2016 including the specification, drawings and abstract, is incorporated herein by reference in its entirety.

BACKGROUND OF THE INVENTION

1. Field of the Invention

The present invention relates to a steering system.

2. Description of the Related Art

There has hitherto been a so-called rack-parallel steering system in which thrust in the axial direction of a rack shaft is generated by an electric motor that includes an output shaft disposed away from and in parallel with the rack shaft to assist drive of the rack shaft. In such a steering system, external threads are formed on the outer peripheral surface of the rack shaft, and internal threads are formed on the inner peripheral surface of a nut disposed on the radially outer side of the rack shaft. A plurality of balls (rolling elements) are disposed between the external threads and the internal threads which face each other to constitute a ball screw device.

In the steering system described above, the nut is formed in a cylindrical shape, and one end of the nut is supported on a housing via a rolling bearing (double-row angular ball bearing). The other end of the nut is connected to the output shaft of the motor via a toothed belt so that the nut is rotated by rotational drive of the motor to move the rack shaft in the axial direction. Specifically, a drive pulley that includes external teeth is provided on the output shaft of the motor. A driven pulley that includes external teeth is provided at the other end of the nut integrally with the nut. The toothed belt extends between the drive pulley and the driven pulley in the state of being meshed with the teeth of the pulleys.

When the motor is rotationally driven to drive the toothed belt in the configuration described above, however, the toothed belt and the pulleys which contact each other may be displaced relative to each other, which may generate abrasion powder. In this event, it is requested that the generated abrasion powder should not enter the rolling bearing. In order to address such a request, International Publication No. 2016/125368 describes a system in which a seal member is provided on a side surface of a rolling bearing on the side of a toothed belt not to leave a clearance that communicates with a space inside the rolling bearing, the rolling bearing being positioned in the vicinity of the toothed belt in the axial direction.

SUMMARY OF THE INVENTION

An object of the present invention is to provide a rack-parallel steering system that prevents entry of abrasion powder into a rolling bearing using a configuration that is different from the rolling bearing described in International Publication No. 2016/125368 mentioned above.

An aspect of the present invention provides a steering system including: a steered shaft supported on a housing so as to be reciprocally movable in an axial direction to steer steered wheels; a ball screw device that includes a rolling element screw portion in which an outer peripheral rolling groove is formed spirally in an outer peripheral surface of the steered shaft, a rolling element nut, in an inner peripheral surface of which an inner peripheral rolling groove corresponding to the outer peripheral rolling groove is formed, and a plurality of rolling elements rollably arranged in a rolling path formed between the outer peripheral rolling groove and the inner peripheral rolling groove; a motor that is fixed to the housing and that includes an output shaft offset from the steered shaft; a drive force transfer mechanism that includes a toothed drive pulley provided so as to be rotatable together with the output shaft, a toothed driven pulley provided integrally with the rolling element nut, and a toothed belt that transfers a drive force between the drive pulley and the driven pulley; and a rolling bearing disposed between the housing and the rolling element nut to support the rolling element nut so as to be rotatable relative to the housing. A first seal member that contacts an outer ring and an inner ring is provided on a side surface of the rolling bearing on a side of the driven pulley. A second seal member that does not contact the outer ring or the inner ring is provided on a side surface of the rolling bearing on a side opposite to the side surface on the side of the driven pulley.

With such a configuration, the rolling bearing is provided with the first seal member on a side surface on the side of the driven pulley where wear tends to occur, which prevents entry of abrasion powder into the rolling bearing. The second seal member which does not contact the inner ring of the rolling bearing is provided on a side surface on the side opposite to the side of the driven pulley where much abrasion powder is not generated. Consequently, a lubricant such as grease can be retained so as not to flow out of the rolling bearing, and the sliding resistance of the inner ring with respect to the outer ring of the rolling bearing can be reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
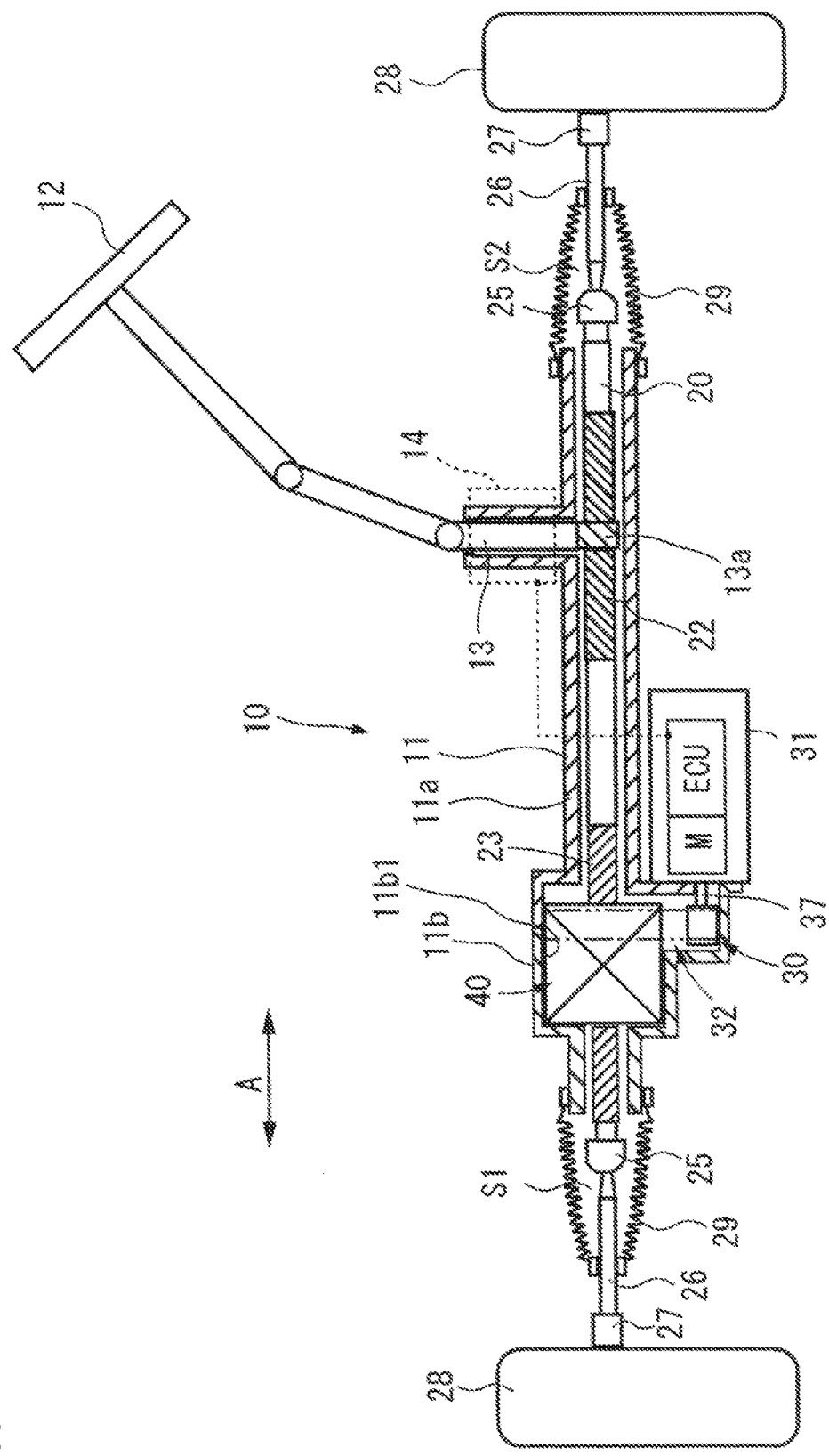
FIG. 1 is a schematic diagram illustrating an electric power steering system according to the present invention.

An embodiment of the present invention will be described below with reference to the drawings. FIG. 1 illustrates the entirety of an electric power steering system (corresponding to the steering system) according to the present invention. The electric power steering system is a steering system that supplements a steering force with a steering assist force.

The electric power steering system 10 (hereinafter referred to simply as a "steering system 10") is a device that steers steered wheels 28 and 28 of a vehicle by reciprocally moving a steered shaft 20 coupled to the steered wheels 28 and 28 in the A direction (right-left direction in FIG. 1) which coincides with the axial direction of the steered shaft 20.

As illustrated in FIG. 1, the steering system 10 includes a housing 11, a steering wheel 12, a steering shaft 13, a torque detection device 14, an electric motor M (hereinafter referred to as a "motor M"), the steered shaft 20 discussed earlier, a steering assist mechanism 30, and a ball screw device 40.

The housing 11 is a fixed member fixed to the vehicle. The housing 11 is formed in a tubular shape, and supports the steered shaft 20 (corresponding to the steered shaft) which is inserted so as to be reciprocally movable in the A direction. The housing 11 includes a first housing 11a and a second housing 11b fixed to the second end side (left side in FIG. 1) of the first housing 11a in the A direction.

The steering wheel 12 is fixed to an end portion of the steering shaft 13, and rotatably supported in a cabin. The steering shaft 13 transfers torque applied to the steering wheel 12 by an operation by a driver to the steered shaft 20.

A pinion 13a that constitutes the rack-and-pinion mechanism is formed at an end portion of the steering shaft 13 on the side of the steered shaft 20. The torque detection device 14 detects torque applied to the steering shaft 13 on the basis of the amount of twist of the steering shaft 13.

The steered shaft 20 extends in the A direction. A rack 22 is formed on the steered shaft 20. The rack 22 is meshed with the pinion 13a of the steering shaft 13, and constitutes the rack-and-pinion mechanism together with the pinion 13a. For the rack-and-pinion mechanism, the maximum axial force that can be transferred between the steering shaft 13 and the steered shaft 20 can be set on the basis of usage of the steering system 10 etc.

The steered shaft 20 has joints 25 and 25 at both end portions. Tie rods 26 and 26 are coupled to both end portions of the joints 25 and 25. The distal ends of the tie rods 26 and 26 are coupled to the right and left steered wheels 28 and 28 via knuckle arms 27 and 27.

Consequently, when the steering wheel 12 is operated, the steered shaft 20 is linearly reciprocally moved via the rack-and-pinion mechanism. When this movement along the A direction is transferred to the knuckle arms 27 and 27 via the tie rods 26 and 26, the steered wheels 28 and 28 are steered to change the advancing direction of the vehicle.

First end portions (end portions) of boots 29 and 29 are air-tightly fixed to both ends of the housing 11 in the A direction. The boots 29 and 29 are made of a resin, for example, and each have a tubular bellow portion that mainly covers a joint portion between the joint 25, 25 and the tie rod 26, 26 and that is expandable in the A direction. Second end portions (end portions) of the boots 29 and 29 are air-tightly fixed to the tie rods 26 and 26. The boots 29 and 29 suppress entry of foreign matter such as dust and water into the housing 11 and the joints 25 and 25. An internal space 51 of the boot 29 on the left side and an internal space S2 of the boot 29 on the right side communicate with each other through a space inside the housing 11.

A ball screw portion 23 is formed on the steered shaft 20 at a position that is different from the rack 22. The ball screw portion 23 constitutes the ball screw device 40 together with a ball screw nut 21 to be discussed later. The steering assist mechanism 30 transfers a steering assist force to the ball screw portion 23.

The steering assist mechanism 30 is a mechanism that applies a steering assist force to the steered shaft 20 using the motor M as a drive source. The steering assist mechanism 30 includes the motor M, a control unit ECU that drives the motor M, and a drive force transfer mechanism 32. The motor M and the control unit ECU which drives the motor M are fixed to and housed in a case 31 fixed to the first housing 11a of the housing 11. The control unit ECU decides steering assist torque and controls an output of the motor M on the basis of a signal output from the torque detection device 14.

Figure 2:
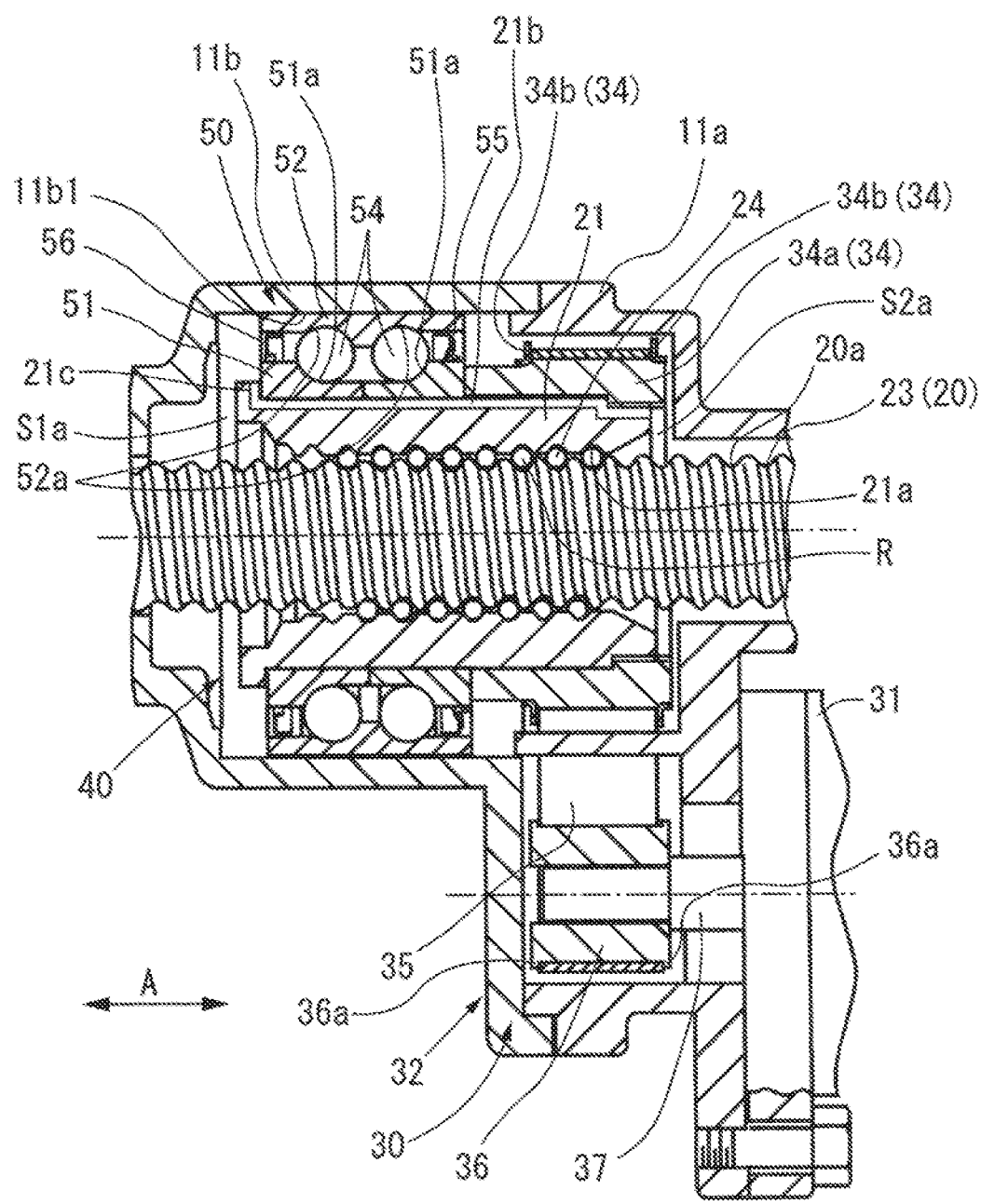
FIG. 2 is a partial enlarged sectional view of a steering assist mechanism in FIG. 1 according to an embodiment.

As illustrated in FIG. 2, the drive force transfer mechanism 32 includes a drive pulley 36, a driven pulley 34, and a toothed belt 35. The drive pulley 36 and the driven pulley 34 are each a toothed pulley that includes external helical teeth. The toothed belt 35 is a circular rubber belt that has a plurality of inner helical teeth on the inner peripheral side.

The drive pulley 36 is mounted on an output shaft 37 of the motor M so as to be rotatable together therewith. The output shaft 37 is disposed in parallel with (corresponding to being offset from) the axis of the steered shaft 20. Ribs 36a (corresponding to the flanges) that suppress the toothed belt 35 slipping off from the drive pulley 36 are formed at both end portions of the drive pulley 36 in the A direction.

Consequently, in the case where the motor M and the drive pulley 36 are rotationally driven and the toothed belt 35 is driven accordingly, the toothed belt 35 is prevented from slipping off from the drive pulley 36 with the rib 36a abutting against a side surface of the toothed belt 35, even if the toothed belt 35 is to be moved either way in the A direction on the outer peripheral surface of the drive pulley 36 because of the effect of meshing engagement between the helical teeth of the toothed belt 35 and the drive pulley 36.

The driven pulley 34 is provided on the outer periphery of the first end side of the ball screw nut 21 to be discussed later so as to be rotatable together with the ball screw nut 21. The driven pulley 34 is a cylindrical member that includes a pulley body 34a and rib portions 34b. In the embodiment, the rib portions 34b are formed to be circular separately from the driven pulley 34. The rib portions 34b are press-fitted and fixed to both sides, in the A direction, of the external teeth of the driven pulley 34 (pulley body 34a).

Figure 3:
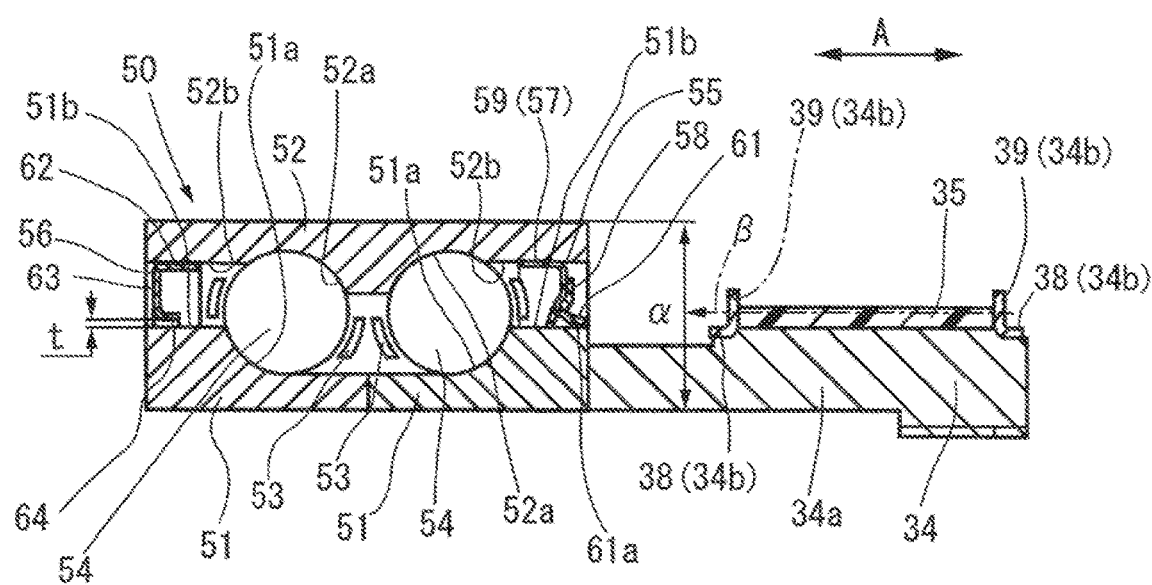
FIG. 3 is a partial enlarged view of FIG. 2.

Particularly, as illustrated in FIG. 3, the rib portions 34b are formed in an L-shape in section when cut along a plane that includes the axis of the driven pulley 34. One side of the L-shape is a cylindrical portion 38, and the other side of the L-shape is a circular portion 39 (corresponding to the driven pulley flange). The inner peripheral surface of the cylindrical portion 38 is press-fitted with the outer peripheral surface on both sides of the external teeth of the driven pulley 34. A part of the circular portion 39 projects in the radial direction from the outer peripheral surface of the driven pulley 34 by a predetermined amount.

Consequently, in the case where the motor M and the drive pulley 36 are rotationally driven and the toothed belt 35 is driven accordingly, the toothed belt 35 is prevented from slipping off from the driven pulley 34 with the circular portion 39 abutting against a side surface of the toothed belt 35, even if the toothed belt 35 is to be moved either way in the A direction from the outer peripheral surface of the driven pulley 34 because of the effect of meshing engagement between the helical teeth of the toothed belt 35 and the driven pulley 34. The driven pulley 34 is fixed to the ball screw nut 21 by a fixing mechanism (not illustrated) so as not to be relatively rotatable with respect to the ball screw nut 21.

The toothed belt 35 extends between the outer periphery of the driven pulley 34 and the outer periphery of the drive pulley 36 in the state of being meshed with the helical teeth which are provided on the outer peripheries. In this event, the toothed belt 35 extends between the driven pulley 34 and the drive pulley 36 with predetermined tension such that the driven pulley 34 and the drive pulley 36 are not disengaged from each other, that is, such that a tooth jump is not caused.

Consequently, the drive force transfer mechanism 32 transfers a rotational drive force (drive force) between the drive pulley 36 and the driven pulley 34. The second end side (left side in FIG. 2) of the ball screw nut 21 in the A direction is rotatably supported on an inner peripheral surface 11b1 of the second housing 11b via a ball bearing 50 (corresponding to the rolling bearing) to be discussed in detail later.

As illustrated in FIG. 2, the ball screw device 40 is mainly housed in the second housing 11b. The ball screw device 40 includes the ball screw portion 23 (corresponding to the rolling element screw portion) of the steered shaft 20 discussed earlier, the ball screw nut 21 (corresponding to the rolling element nut), and a plurality of rolling balls 24 (corresponding to the plurality of rolling elements). An outer peripheral rolling groove 20a is formed spirally in the outer peripheral surface of the ball screw portion 23 of the steered shaft 20. The outer peripheral rolling groove 20a is formed to be wound a plurality of times.

The ball screw nut 21 is formed in a tubular shape, and disposed so as to be coaxial with the ball screw portion 23 (steered shaft 20) on the outer peripheral side of the ball screw portion 23. An inner peripheral rolling groove 21a is formed spirally in the inner peripheral surface of the ball screw nut 21. The inner peripheral rolling groove 21a is formed to be wound a plurality of times. The outer peripheral rolling groove 20a of the ball screw portion 23 and the inner peripheral rolling groove 21a of the ball screw nut 21 are disposed to face each other. A rolling path R in which the plurality of rolling balls 24 roll is formed between the outer peripheral rolling groove 20a and the inner peripheral rolling groove 21a which correspond to each other. As illustrated in FIG. 2, a flange 21c that projects radially outward is formed at the outer peripheral edge portion of the ball screw nut 21 on the side opposite to the driven pulley 34. The flange 21c regulates movement of the ball bearing 50 to be discussed later toward the second end side in the A direction.

The plurality of rolling balls 24 are arranged in the rolling path R so as to be rollable. Consequently, the outer peripheral rolling groove 20a of the ball screw portion 23 and the inner peripheral rolling groove 21a of the ball screw nut 21 are threadably engaged with each other via the plurality of rolling balls 24.

With the configuration described above, the steering assist mechanism 30 drives the motor M in accordance with an operation to rotate the steering wheel 12, and rotates the output shaft 37 and the drive pulley 36. Rotation of the drive pulley 36 is transferred to the driven pulley 34 via the toothed belt 35. When the driven pulley 34 is rotated, the ball screw nut 21 which is provided integrally with the driven pulley 34 is rotated.

When the ball screw nut 21 is rotated, a steering assist force (power) in the axial direction of the steered shaft 20 is transferred to the steered shaft 20 via the plurality of rolling balls 24 of the ball screw device 40. Consequently, the steered shaft 20 (steered shaft) is moved in the axial direction.

The plurality of rolling balls 24 which roll in the rolling path R are endlessly circulated by a deflector (not illustrated) provided in the ball screw nut 21. It should be noted, however, that the technique of endlessly circulating the rolling balls 24 using the deflector is known and thus not described in detail. As illustrated in FIG. 2, a communication path 21b for communication between spaces S1a and S2a formed at both end portions of the ball screw nut 21 in the A direction is formed in the outer peripheral surface of the ball screw nut 21.

It should be noted, however, that the communication path (groove) for communication between the spaces S1a and S2a is not limited to the aspect described above and may be formed anywhere and anyhow. For example, a part of the communication path may be formed in the inner peripheral surface of the driven pulley 34. The communication path may be formed in the inner peripheral surface of the housing 11, although the strength of the housing 11 may be lowered. As discussed earlier, the communication path 21b enables communication between the internal space S1 of the boot 29 on the left side and the internal space S2 of the boot 29 on the right side through a space inside the housing 11.

Next, the ball bearing 50 (corresponding to the rolling bearing) will be described with reference to FIGS. 2 and 3. A double-row angular ball bearing or the like is used as the ball bearing 50. As discussed earlier, the ball bearing 50 is disposed between the outer peripheral surface of the second end side (left side in FIG. 2) of the ball screw nut 21 in the A direction and the inner peripheral surface 11b1 of the second housing 11b in the radial direction. In this event, a slight clearance is provided between the inner peripheral surface of an inner ring 51 to be discussed later and the outer peripheral surface of the ball screw nut 21 and between the outer peripheral surface of an outer ring 52 and the inner peripheral surface 11b1 of the second housing 11b.

It should be noted, however, that this aspect is merely illustrative of one example, and press-fitting may be performed between the inner peripheral surface of the inner ring 51 and the outer peripheral surface of the ball screw nut 21 or between the outer peripheral surface of the outer ring 52 and the inner peripheral surface 11b1 of the second housing 11b. Consequently, the ball bearing 50 supports the ball screw nut 21 so as to be rotatable relative to the second housing 11b (housing 11).

As illustrated in FIGS. 2 and 3, the ball bearing 50 is disposed adjacent to the driven pulley 34, which is disposed on the first end side (right side in FIGS. 1 and 2) of the ball screw nut 21, in the A direction. Consequently, the overall lengths of the steered shaft 20 and the housing 11 in the A direction can be reduced. The circular portion 39 (corresponding to the flange and the driven pulley flange) of the driven pulley 34 is disposed such that a radial position β of the circular portion 39 is in a radial range α between the outer peripheral surface of the outer ring 52 of the ball bearing 50 and the inner peripheral surface of the inner ring 51 in the radial direction of the ball screw nut 21. In this event, the radial position β of the circular portion 39 is defined as the center position of the extension length of the circular portion 39 in the radial direction. Consequently, the outside diameter of the driven pulley 34 can be set to be small, which reduces the size of the housing 11 in the radial direction.

As illustrated in FIG. 3, the ball bearing 50, which is an example of a double-row angular ball bearing, includes inner rings 51 and 51, the outer ring 52, a plurality of rolling balls 54 accommodated between track surfaces 51a and 51a formed in the outer peripheral surfaces of the inner rings 51 and 51 and track surfaces 52a and 52a formed in the inner peripheral surface of the outer ring 52, a retainer 53 (cage) that retains the rolling balls 54 at predetermined intervals on the track surfaces 51a and 52a, a seal member 55 (corresponding to the first seal member), and a shield member 56 (corresponding to the second seal member). The configuration of the inner rings 51 and 51, the outer ring 52, the track surfaces 51a and 51a, the track surfaces 52a and 52a, the plurality of rolling balls 54, and the retainer 53 is the same as the configuration of a double-row angular ball bearing according to the related art, and therefore is not described.

Outer peripheral surfaces 51b and 51b of the inner rings 51 are cylindrical surfaces that have a constant diameter except on the track surfaces 51a and 51a at the center portion in the A direction. Both end portions, in the A direction, of inner peripheral surfaces 52b and 52b of the outer ring 52 are cylindrical inner peripheral surfaces that have a constant diameter.

Next, the seal member of the ball bearing will be described. As illustrated in FIGS. 2 and 3, the seal member 55 (first seal member) is provided on the right side surface, in the A direction (axial direction), between the inner ring 51 and the outer ring 52 so as to contact the outer ring 52 and the inner ring 51. Consequently, the seal member 55 separates a space on the side of the driven pulley 34 (toothed belt 35) and a space inside the ball bearing 50.

Specifically, the seal member 55 is constituted of a plate 57 in a generally circular shape and made of metal and a rubber elastic body 58 molded integrally with the plate 57 at an intermediate portion of the plate 57. The seal member 55 includes a fitted portion 59 formed by the plate 57, an intermediate planar portion 60 integrally formed by the plate 57 and the elastic body 58, and a lip portion 61 formed by only the elastic body 58.

The fitted portion 59 is formed by bending the outer peripheral portion of the plate 57 generally orthogonally toward the inner side of the ball bearing 50 in the A direction. The outer peripheral surface of the cylinder is press-fitted with the inner peripheral surface 52b of the outer ring 52. The intermediate planar portion 60 is connected to an end portion of the fitted portion 59, and formed in a substantially circular shape to extend orthogonally to the A direction.

The lip portion 61 is formed to extend from the inner peripheral portion of the plate 57 of the intermediate planar portion 60 as inclined toward only the outer side in the A direction in a sectional surface that includes the axis of the ball screw nut 21 such that an inner peripheral surface 61a of the lip portion 61 contacts the outer peripheral surface 51b of the inner ring 51. In this event, the shape of the lip portion 61 is set such that the inner peripheral surface 61a contacts the outer peripheral surface 51b with a predetermined surface pressure. Such contact between the lip portion 61 and the outer peripheral surface 51b prevents entry of abrasion powder that is present on the outer side of the lip portion 61 (on the side of the driven pulley 34) into the ball bearing 50 well.

Next, the shield member 56 (second seal member) of the ball bearing will be described. The shield member 56 is made of metal, for example, and provided at the second end portion (left end portion in FIG. 2), in the A direction (axial direction), between the inner ring 51 and the outer ring 52 so as to block a part of a space between the inner ring 51 and the outer ring 52. In the embodiment, the shield member 56 is provided on a side surface of the ball bearing 50 on the side opposite to the side surface on the side of the driven pulley 34 so as to contact the outer ring 52 and not to contact the inner ring 51.

Specifically, the shield member 56 is formed from a plate made of metal. The shield member 56 is an annular member integrally formed from a fitted portion 62 press-fitted with the inner peripheral surface 52b of the outer ring 52 to be fixed, a circular planar portion 63 that extends radially inward from the fitted portion 62 to the vicinity of the outer peripheral surface 51b of the inner ring 51, and a flange portion 64 formed by bending the inner peripheral portion of the planar portion 63 generally orthogonally toward the inner side in the A direction. The fitted portion 62 is formed by bending the outer peripheral portion of the planar portion 63 generally orthogonally toward the inner side of the ball bearing 50 in the A direction. The outer peripheral surface of the cylinder is press-fitted with the inner peripheral surface 52b of the outer ring 52.

The planar portion 63 is formed to extend in parallel with a plane that is orthogonal to the A direction. The flange portion 64 is formed by bending the inner peripheral portion of the planar portion 63 generally orthogonally toward the inner side of the ball bearing 50 in the A direction. A predetermined clearance t is formed between the inner peripheral surface of the cylinder of the flange portion 64 and the outer peripheral surface 51b of the inner ring 51.

In this way, the shield member 56 separates an external space on the side opposite to the driven pulley 34 and the internal space of the ball bearing 50 in the A direction with a slight clearance (predetermined clearance t) between the shield member 56 and the outer peripheral surface of the inner ring 51. With this configuration, a lubricant such as grease is retained well at an appropriate location in an annular space surrounded by the inner ring 51, the outer ring 52, the seal member 55, and the shield member 56 without flowing out, which allows lubrication of the outer ring 52, the inner rings 51 and 51, the rolling balls 54, and the retainer 53 (cage).

The inner rings 51 and 51 and the shield member 56 do not contact each other. Thus, torque for rotation of the inner rings 51 and 51 with respect to the outer ring 52 is not raised by friction (a sliding resistance). The size of the predetermined clearance t may be set as desired on the basis of the results of evaluating the performance of the clearance t in retaining the lubricant such as grease etc. It should be noted, however, that the present invention is not limited to this aspect. The size of the predetermined clearance t may be set in any manner.

Next, the effect will be described. When the driver operates the steering wheel 12, the steered shaft 20 is moved linearly in the A direction via the rack-and-pinion mechanism. When the steered shaft 20 is moved rightward in FIG. 1, for example, the bellows of the boot 29 on the left side are pulled in the extending direction. In this event, as discussed earlier, the communication path 21b (see FIG. 2) for communication between the space S1a and the space S2a and communication between the internal space S1 and the internal space S2 is formed in the outer peripheral surface of the ball screw nut 21. Therefore, the internal space S1 can be expanded in the above operation.

At the same time, the bellows of the boot 29 on the right side is compressed, and the internal space S2 starts being compressed. Therefore, air in the internal space S2 immediately passes through the communication path 21b to be moved to the internal space S1. In this way, air immediately starts being moved through the communication path 21b even if the steered shaft 20 is moved leftward in the A direction and the internal space S1 starts being expanded and at the same time the internal space S2 starts being compressed. Therefore, the pressures in the internal spaces S1 and S2 are not varied significantly.

Next, when the drive force transfer mechanism 32 of the steering assist mechanism 30 is driven, the toothed belt 35 is driven inside the housing 11. When the toothed belt 35 is driven, the toothed belt 35 is to be moved either way in the A direction with respect to the drive pulley 36 through the action of the drive pulley 36 and the helical teeth which are meshed with each other. Consequently, the toothed belt 35 contacts the rib 36a (flange) of the drive pulley 36 to be worn, which generates abrasion powder.

In the embodiment, however, a flow of air is not easily caused in the vicinity of the drive pulley 36, where much abrasion powder is generated, since the communication path 21b is provided in the outer peripheral surface of the ball screw nut 21, and there is a low possibility that the abrasion powder which has been generated at the drive pulley 36 is scattered to the ball bearing 50. However, it is also conceivable that a part of the abrasion powder is carried to the driven pulley 34 along with rotational drive of the toothed belt 35.

In this case, it is conceivable that the abrasion powder which has been carried to the driven pulley 34 is scattered to the ball bearing 50 by the flow of air discussed earlier. In the embodiment, however, the ball bearing 50 includes the seal member 55 which is provided on a side surface on the side of the driven pulley 34 (toothed belt 35) and which contacts the outer ring 52 and the inner ring 51 and separates a space on the side of the driven pulley 34 (toothed belt 35) and a space inside the ball bearing 50. Thus, there is no possibility that the abrasion powder enters the ball bearing 50.

Abrasion powder may be generated not only from the drive pulley 36 but also from the driven pulley 34 for the same reason as the drive pulley 36. That is, the toothed belt 35 is moved either way in the A direction with respect to the driven pulley 34 through the action of the helical teeth of the driven pulley 34 which is meshed with the toothed belt 35. Consequently, a side surface of the toothed belt 35 contacts the circular portion 39 (flange) of the rib portion 34b of the driven pulley 34, which may wear the toothed belt 35 to generate abrasion powder.

In this event, in particular, the driven pulley 34 is disposed adjacent to the ball bearing 50 in the A direction such that the radial position β of the circular portion 39 (driven pulley flange) of the driven pulley 34 is in the radial range α between the outer peripheral surface of the outer ring 52 of the ball bearing 50 and the inner peripheral surfaces of the inner ring 51. Therefore, much of the abrasion powder which is generated from the toothed belt 35 may be scattered toward a side surface of the ball bearing 50 along with a flow of air that flows through the communication path 21b.

As discussed above, however, the ball bearing 50 includes the seal member 55 which is provided on a side surface on the side of the driven pulley 34 (toothed belt 35) and which contacts the outer ring 52 and the inner ring 51 and separates a space on the side of the driven pulley 34 (toothed belt 35) and a space inside the ball bearing 50. Thus, there is no possibility that the abrasion powder which is generated between the driven pulley 34 and the toothed belt 35 enters the ball bearing 50. The abrasion powder which remains after being scattered is not suctioned into the ball bearing 50 through the respiratory effect due to variations in internal temperature of the bearing 50 because of the presence of the seal member 55.

In this event, the ball bearing 50 includes the shield member 56 which is provided on a side surface on the side opposite to a side surface on the side of the driven pulley 34 and which contacts the outer ring 52 and does not contact the inner ring 51. Therefore, a lubricant such as grease is retained well at an appropriate location in an annular space surrounded by the inner ring 51, the outer ring 52, the seal member 55, and the shield member 56 without flowing out. The outer ring 52, the inner ring 51, the rolling balls 54, and the retainer 53 (cage) are lubricated well by the retained lubricant such as grease. The shield member 56 does not contact the inner ring 51. Thus, the sliding resistance between the shield member 56 and the inner rings 51 is not raised by friction. Therefore, the ball screw nut 21 can be rotationally driven well.

Other aspects will be described. In the embodiment described above, the rib 36a (flange) of the drive pulley 36 and the circular portion 39 (flange, driven pulley flange) of the driven pulley 34 are provided over the entire circumference of an end portion of the outer periphery of the pulleys 36 and 34. However, the present invention is not limited to this aspect. Each flange (rib 36a, circular portion 39) may be provided at only a part, in the circumferential direction, of an end portion of the drive pulley 36 and the driven pulley 34. Alternatively, the flange (rib 36a, circular portion 39) may be provided to only one of the driven pulley 34 and the drive pulley 36. Also with such configurations, an effect that matches the amount of generated abrasion powder can be obtained.

In the embodiment described above, all the drive pulley 36, the driven pulley 34, and the toothed belt 35 have helical teeth. However, the present invention is not limited to this aspect. The teeth may be teeth of any type, including spur teeth. Therefore, no abrasion powder is generated between a side surface of the toothed belt 35 which has helical teeth and the flanges (rib 36a, circular portion 39) when the toothed belt 35 is moved in the A direction. However, it is conceivable that abrasion powder may be generated through only meshing operation at a meshing portion at which the teeth of the pulleys 34 and 36 and the teeth of the toothed belt 35 are meshed with each other. Also in this case, an effect that matches the amount of generated abrasion powder can be obtained.

In the embodiment described above, the driven pulley 34 is adjacent to the ball bearing 50 in the A direction. However, the present invention is not limited to this aspect. A separate member may be interposed between the driven pulley 34 and the ball bearing 50 in the A direction. Also with such a configuration, an effect that matches the amount of abrasion powder reaching the ball bearing 50 can be obtained.

In the embodiment described above, the circular portion 39 (driven pulley flange) of the driven pulley 34 is disposed such that the radial position β of the circular portion 39 is in the radial range α between the outer peripheral surface of the outer ring 52 of the ball bearing 50 and the inner peripheral surface of the inner ring 51 in the radial direction of the ball screw nut 21. However, the present invention is not limited to this aspect. The radial direction β of the circular portion 39 (driven pulley flange) of the driven pulley 34 may not be in the radial range α. Also with such a configuration, a matching effect can be obtained.

In the embodiment described above, the seal member 55 is fixed to the ball bearing 50 by directly press-fitting the fitted portion 59, which is formed from the plate 57 which is made of metal, with the inner peripheral surface 52b of the outer ring 52. However, the present invention is not limited to this aspect. For example, the seal member 55 may be fixed to the inner peripheral surface 52b of the outer ring 52 with the plate 57 coated with the elastic body 58. In this case, the seal member 55 may be fixed by press-fitting, or by forming a groove in an end portion, in the A direction, of the inner peripheral surface 52b of the outer ring 52 and holding the fitted portion in the groove. Also with such configurations, a sufficient effect can be obtained.

In the embodiment described above, by way of example, the ball bearing 50 (rolling bearing) is a double-row angular ball bearing. However, the present invention is not limited to this aspect. The rolling bearing may be a bearing of any type that includes an outer ring, an inner ring, and rollers or balls provided between the outer ring and the inner ring to serve as rolling elements.

The present invention is not limited to the embodiment described above, and the shield member 56 of the ball bearing 50 (rolling bearing) may be configured such that the fitted portion 59 is fixed to the inner ring 51 and a predetermined clearance t is provided between the flange portion 64 and the outer ring 52. Also with such a configuration, the effect in retaining the lubricant in the ball bearing 50 and the effect of the ball bearing 50 in reducing rotational torque can be obtained accordingly.

In the embodiment described above, the communication path 21b is provided to form a flow of air between the right side and the left side in the housing 11. However, the communication path 21b may not be provided, and a flow of air may not be formed between the right side and the left side in the housing 11. By way of example, both ends of the housing 11 and the outside may communicate with each other. Consequently, no flow of air between the right side and the left side in the housing 11 is caused. In the embodiment, however, the driven pulley 34 is disposed in the vicinity of the ball bearing 50. Thus, there is a high possibility that abrasion powder generated at the driven pulley 34 reaches the ball bearing 50 because of the effect of vibration or the like. Also in such a case, in the same manner as described above, a sufficient effect can be obtained in preventing entry of the abrasion powder into the ball bearing 50.

In the embodiment described above, the ball bearing 50 is interposed between the ball screw nut 21 and the housing 11b. However, the present invention is not limited to this aspect. The driven pulley 34 may extend toward the second end side, and the driven pulley 34 may be interposed between the ball screw nut 21 and the ball bearing 50, as in the related art (International Publication No. 2016/125368). Also with such a configuration, the same effect as that obtained with the embodiment described above can be obtained.

The effect of the embodiment described above will be discussed. In the embodiment described above, a steering system 10 includes: a steered shaft 20 supported on a housing 11 so as to be reciprocally movable in an axial direction to steer steered wheels 28 and 28; and a ball screw device 40 that includes a ball screw portion 23 (rolling element screw portion) in which an outer peripheral rolling groove 20a is formed spirally in an outer peripheral surface of the steered shaft 20, a ball screw nut 21 (rolling element nut), in an inner peripheral surface of which an inner peripheral rolling groove 21a corresponding to the outer peripheral rolling groove 20a is formed, and a plurality of rolling balls 24 (rolling elements) rollably arranged in a rolling path R formed between the outer peripheral rolling groove 20a and the inner peripheral rolling groove 21a.

The steering system 10 also includes: a motor M that is fixed to the housing 11 and that includes an output shaft 37 offset from the steered shaft 20; a drive force transfer mechanism 32 that includes a toothed drive pulley 36 provided so as to be rotatable together with the output shaft 37, a toothed driven pulley 34 provided integrally with the ball screw nut 21, and a toothed belt 35 that transfers a drive force between the drive pulley 36 and the driven pulley 34; and a ball bearing 50 (corresponding to the rolling bearing) disposed between the housing 11 and the ball screw nut 21 to support the ball screw nut 21 so as to be rotatable relative to the housing 11.

A seal member 55 (first seal member) that contacts an outer ring 52 and an inner ring 51 is provided on a side surface of the ball bearing 50 on a side of the driven pulley 34. A shield member 56 (second seal member) that does not contact the inner ring 51 is provided on a side surface of the ball bearing 50 on a side opposite to the side surface on the side of the driven pulley 34.

With such a configuration, the ball bearing 50 is provided with the seal member 55 (first seal member) on a side surface on the side of the driven pulley 34 (toothed belt 35) where wear tends to occur, which prevents entry of abrasion powder into the ball bearing 50. The shield member 56 (second seal member) which does not contact the inner ring 51 is provided on a side surface on the side opposite to the side of the driven pulley 34 where much abrasion powder is not generated. Consequently, the shield member 56 retains a lubricant such as grease well so that the lubricant does not flow out of the ball bearing 50, and reduces the sliding resistance of the inner ring 51 with respect to the outer ring 52.

In the embodiment described above, the ball bearing 50 (rolling bearing) of the steering system 10 is disposed adjacent to the driven pulley 34 in the axial direction. With the ball bearing 50 disposed adjacent to the driven pulley 34 in this way, the ball bearing 50 tends to receive scattered abrasion powder generated between the driven pulley 34 and the toothed belt 35. However, the ball bearing 50 can effectively prevent entry of the abrasion powder into the ball bearing 50 using the seal member 55 (first seal member) which is provided on the side of the driven pulley 34. Thus, the size of the steering system 10 can be reduced by disposing the ball bearing 50 close to and adjacent to the driven pulley 34 without concern for entry of abrasion powder.

In the embodiment described above, the toothed drive pulley 36, the toothed driven pulley 34, and the toothed belt 35 of the drive force transfer mechanism 32 have helical teeth. Consequently, the helical teeth of the toothed belt 35 are meshed with the helical teeth of the drive pulley 36 and the driven pulley 34 to be driven, which occasionally moves the toothed belt 35 in the axial direction of the steered shaft 20 with respect to the drive pulley 36 through the action of the helical teeth which are meshed with each other. In this case, the helical teeth which are meshed with each other move relative to each other, which tends to generate abrasion powder. As described above, however, the ball bearing 50 can effectively prevent entry of the abrasion powder into the ball bearing 50 using the seal member 55 (first seal member) which is provided on the side of the driven pulley 34.

In the embodiment described above, a circular portion 39 (flange) or a rib 36a (flange) of the drive pulley 36 that regulates movement of the toothed belt 35 in the axial direction is provided at at least a part of the drive pulley 36 with helical teeth and the driven pulley 34 with helical teeth of the drive force transfer mechanism 32. As discussed above, when the toothed belt 35 with helical teeth is driven, the toothed belt 35 is moved in the axial direction through the action of the helical teeth. Much abrasion powder is discharged with a side surface of the toothed belt 35 and the flanges rubbed against each other. With the same effect as described above, however, entry of the abrasion powder into the ball bearing 50 can be effectively prevented.

In the embodiment described above, the driven pulley 34 of the drive force transfer mechanism 32 includes a circular portion 39 (driven pulley flange) provided at an end portion, in the axial direction, of an outer peripheral surface of the driven pulley 34 to serve as the flange. The circular portion 39 (driven pulley flange) is disposed in a radial range α between an outer peripheral surface of the outer ring 52 of the ball bearing 50 (rolling bearing) and an inner peripheral surface of the inner ring 51 in a radial direction of the ball screw nut 21 (rolling element nut). By disposing the circular portion 39 (driven pulley flange), which may be worn with the toothed belt 35, in the radial range α, entry of generated abrasion powder into the ball bearing 50 can be effectively prevented while reducing the size of the steering system 10 in the radial direction.

In the embodiment described above, the seal member 55 (first seal member) includes a plate 57 made of metal and an elastic body 58 that covers the plate 57. The plate 57 is fixed to the outer ring 52, and the elastic body 58 includes a lip portion 61 that contacts an outer peripheral surface of the inner ring 51. With such a configuration, entry of abrasion powder into the ball bearing 50 can be prevented easily and reliably.

In the embodiment described above, the lip portion 61 extends from the plate 57 toward only an outer side of the ball bearing 50 (rolling bearing), and an inner peripheral surface of the lip portion 61 contacts the outer peripheral surface of the inner ring 51. In this way, the lip portion 61 is of a single type, and an inexpensive ready-made seal member that is normally used can be applied easily to reduce the cost.

In the embodiment described above, the steering system 10 further includes: boots 29 and 29 provided to respectively cover both ends of the steered shaft 20, the boots 29 and 29 each having an end portion connected to the housing 11 and an end portion connected to a tie rod 26, 26; and a communication path 21b provided in at least one of the ball screw nut 21 (rolling element nut) and the driven pulley 34 to communicate both sides, in the axial direction, of the ball screw nut 21 (rolling element nut) with each other.

Consequently, when the driver operates the steering wheel 12 to linearly move the steered shaft 20, one of the right and left boots 29 and 29 is expanded, and the other is compressed. In this event, air in the housing 11 is moved well between the right side and the left side with the presence of the communication path 21b. Therefore, an air flow is caused in the housing 11, and a part of abrasion powder generated between the pulleys 34 and 36 and the toothed belt 35 is moved in the housing 11 along with the air flow. Consequently, the amount of abrasion powder to enter the ball bearing 50 is decreased compared to a case where there is no air flow in the housing 11. However, much of abrasion powder generated at the driven pulley 34, which is positioned in the vicinity of the ball bearing 50, is scattered and remains in the vicinity of the ball bearing 50. Also in this event, however, with the effect described above, entry of the abrasion powder into the ball bearing 50 can be prevented easily, and the effect in suppressing rotational torque in the ball bearing 50 can be obtained.

What is claimed is:

1. A steering system comprising:
   a steered shaft supported on a housing so as to be reciprocally movable in an axial direction to steer steered wheels;
   a ball screw device including:
      a rolling element screw portion of the steered shaft, the rolling element screw portion having an outer peripheral rolling groove formed spirally in an outer peripheral surface,
      a rolling element nut having an inner peripheral surface with an inner peripheral rolling groove formed corresponding to the outer peripheral rolling groove, and
      a plurality of rolling elements rollably disposed in a rolling path formed between the outer peripheral rolling groove and the inner peripheral rolling groove;
   a motor fixed to the housing and including an output shaft offset from the steered shaft;
   a drive force transfer mechanism including:
      a toothed drive pulley rotatable with the output shaft,
      a toothed driven pulley integral with the rolling element nut, and
      a toothed belt configured to transfer a drive force between the drive pulley and the driven pulley;
   a rolling bearing disposed between the housing and the rolling element nut, the rolling bearing being configured to support the rolling element nut such that the rolling element nut is rotatable relative to the housing;
   a first seal member contacting an outer ring and an inner ring, the first seal member being disposed on a first side of the rolling bearing proximal to the driven pulley, the first seal member including (i) a metal plate fixed to the outer ring, and (ii) an elastic body covering the metal plate, the elastic body including a lip portion contacting an outer peripheral surface of the inner ring, the lip portion extending from the plate toward an outer side of the rolling bearing, and an inner peripheral surface of the lip portion contacting the outer peripheral surface of the inner ring; and
   a second seal member that does not contact one of the outer ring or the inner ring disposed on a second side of the rolling bearing opposite to the first side.

2. The steering system according to claim 1, wherein the rolling bearing is disposed adjacent to the driven pulley in the axial direction.

3. The steering system according to claim 1, wherein the toothed drive pulley, the toothed driven pulley, and the toothed belt of the drive force transfer mechanism have helical teeth.

4. The steering system according to claim 3, further comprising:
   a drive pulley flange disposed on the drive pulley and a driven pulley flange disposed on the driven pulley, wherein the drive pulley flange and the driven pulley flange are configured to regulate movement of the toothed belt in the axial direction.

5. The steering system according to claim 4, wherein:
   the driven pulley includes the driven pulley flange at an end portion, in the axial direction, of an outer peripheral surface of the driven pulley, and
   the driven pulley flange is disposed between an outer peripheral surface of the outer ring of the rolling bearing and an inner peripheral surface of the inner ring of the rolling bearing in a radial direction with respect to the rolling element nut.

6. The steering system according to claim 1, further comprising:
   a plurality of boots respectively covering both ends of the steered shaft, each boot of the plurality of boots having a first end portion connected to the housing and a second end portion connected to a tie rod; and
   a communication path disposed in at least one of the rolling element nut and the driven pulley to communicate a first side of the rolling element nut with a second side of the rolling nut, in the axial direction.

\* \* \* \* \*